United States Patent [19]

Barth

[11] 3,771,939

[45] Nov. 13, 1973

[54] ULTRASONIC MAGNETIC SURFACE FINISHER

[75] Inventor: Henry V. Barth, Boulder, Colo.

[73] Assignee: International Business Machines Corporation, Armonk, N.Y.

[22] Filed: Dec. 21, 1971

[21] Appl. No.: 210,582

Related U.S. Application Data

[62] Division of Ser. No. 39,408, May 21, 1970, abandoned.

[52] U.S. Cl. .............. 425/385, 425/174.2, 425/810, 425/DIG. 55

[51] Int. Cl. .............................................. B29j 5/00

[58] Field of Search ................. 425/174.2, 385, 810, 425/DIG. 55

[56] References Cited

UNITED STATES PATENTS

| | | | |
|---|---|---|---|
| 3,676,216 | 7/1972 | Abitboul | 425/385 UX |
| 2,736,144 | 2/1956 | Thatcher | 425/385 UX |
| 3,533,836 | 10/1970 | Massengale et al. | 425/174.2 UX |
| 3,022,814 | 2/1962 | Bodine | 425/385 UX |
| 3,635,609 | 1/1972 | Balamuth | 425/385 X |
| 2,945,261 | 7/1960 | Aykanian et al. | 425/DIG. 55 |

FOREIGN PATENTS OR APPLICATIONS

| | | |
|---|---|---|
| 870,713 | 5/1971 | Canada |

*Primary Examiner*—H. A. Kilby, Jr.
*Attorney*—Hanifin & Jancin

[57] ABSTRACT

An ultrasonic surface finisher for magnetic tapes and other magnetic recording media is disclosed. The ultrasonic vibrations of an ultrasonic generator are transmitted to an impacting hammer which in turn impacts and smooths the surface of the magnetic record media by continual impacting while the record media is supported by a resilient backing pad.

6 Claims, 5 Drawing Figures

ULTRASONIC MAGNETIC SURFACE FINISHER

This is a division, of application Ser. No. 39,408 filed May 21, 1970 now abandoned.

FIELD OF THE INVENTION

This invention relates to the manufacture and apparatus for manufacturing magnetic recording media and more specifically to the surface finishing of magnetic record media such as magnetic tapes, magnetic disks, and magnetic strips.

PRIOR ART

Heretofore the surface finishing of magnetic tapes, disks, and strips have been by a calendaring process or by passing the record media past a scraping blade which removes high spots and attempts to yield a uniform thickness of magnetic media, specifically ferric oxide particles on the surface of the substrate. An alternative method has been to use a rotary file which is in the form of a cylinder having flutes or cutting edges cut into its periphery. This rotary file is then rotated at a high rate of speed to burnish, rub, or abrade high spots from the ferric oxide coating, thereby causing a relatively smooth surface. As the requirements for ferric oxide recording surfaces and other magnetically recordable record surfaces are refined and the surface roughness requirements are further refined, attempts have been made to increase the control and reduce the surface roughness by the present prior art methods.

The surface roughness of a magnetically recordable surface is one limiting factor on the bit density and the density of the recorded material on the magnetic record. Present standards call for data density of 3,200 FCI (Flux Changes/Inch). Steps are being taken to increase the data density to 6,400 FCI in order to reduce the amount of magnetically recordable surface required to contain the same amount of data and to increase the read and write speed of peripheral equipment.

As the data densities are increased from 3,200 FCI to 6,400 FCI, the length of time which the flux is applied to the magnetizeable surface is, of course, reduced. This likewise reduces the effect on the ferric oxide material and also makes the recording much more shallow with respect to the surface than the less dense recordings. To obtain reliable recording at the increased data densities, the tape surface must at all times be within acceptable limits with respect to distance from the magnetic recording head. As surface roughness controls the average distance which the magnetically recordable surface will be displaced from the surface of the magnetic head, the surface roughness of the tape must be reduced in order that the tape be maintained closer to the magnetic head.

In order to overcome these limiting factors and problems, it is a primary objective of this invention to improve surface treatment of magnetically recordable surfaces.

It is another object of this invention to ultrasonically treat magnetically recordable surfaces.

It is still another object of this invention to ultrasonically treat magnetically recordable surfaces to reduce surface roughness.

It is a further object of this invention to surface treat magnetically recordable surfaces by ultrasonically impacting the magnetizeable material with an ultrasonic impacting tool.

Other objects will become apparent to one skilled in the art from the detailed explanation to follow.

SUMMARY OF THE INVENTION

The primary object and other objects of the invention are accomplished by the vibrating of a shoe or hammer by an ultrasonic generator and a concentrator resonator horn, such that the hammer vibrates in a direction approximately perpendicular to the surface of a magnetic tape, magnetic disk, or magnetic strip. This ultrasonic, high frequency impacting collapses the high points of the ferric oxide or magnetic oxide coating and helps to fill the low spots, thereby reducing the surface roughness of a magnetic tape or other magnetically recordable record media.

The magnetic record surface is continuously moved between the impacting hammer and a backing block so that incremental areas are sequentially exposed and impacted by the vibrating hammer.

IN THE DRAWINGS

DESCRIPTION OF THE INVENTION

Figure 1:
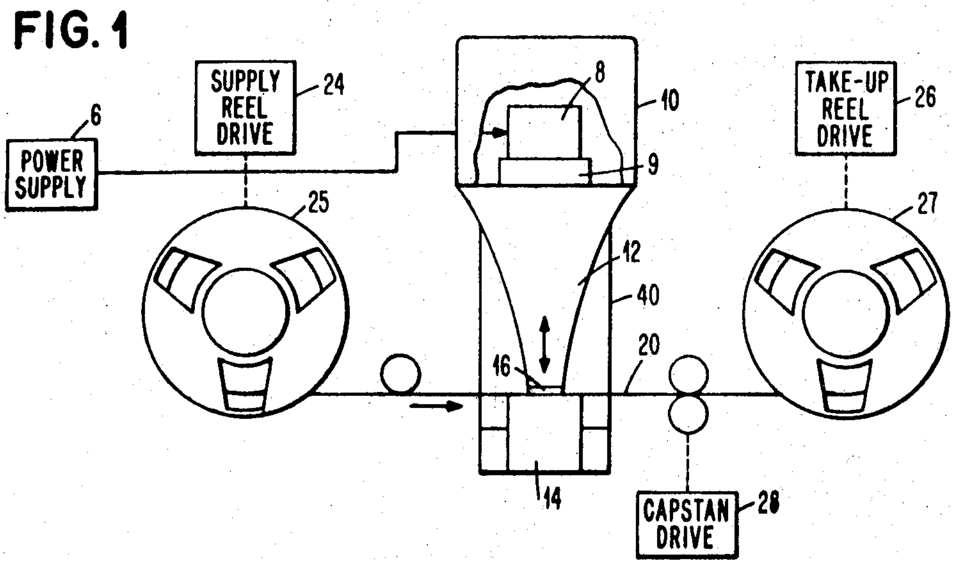
FIG. 1 illustrates the arrangement of the ultrasonic generator, concentrator-resonator horn, and the backing means, together with a tape winding and reeling means.

This invention is equally applicable to any magnetic or ferric oxide surfaced substrate where the structure's ultimate use is a magnetically recordable record member. This category includes magnetic tape, magnetic strips, magnetic disks, and other analogous magnetically recordable items.

The disclosure of the invention will be with relation to magnetic tape; however, one skilled in the art would readily see that the same principles and the same methods and apparatus may be employed for the surface treatment of any of the other magnetic record members.

To secure an ultrasonic output, generator 10 is provided. Ultrasonic generator 10 is activated by a high frequency current. This current is derived from a power supply 6 which changes standard available alternating current to a high frequency current of a frequency in excess of 18,000 Hertz. This high frequency current is conducted to the generator and an electrostrictive trandsucer 8 which vibrates when subjected to an alternating current. This transducer 8 is rigidly attached to a mounting bracket 9. This bracket 9 would vibrate in response to the transducer's vibrations and also serve as an attachment point to which the horn is rigidly attached. Thus the vibrations of the transducer are transmitted to the horn.

Any ultrasonic generator producing an output in the form of vibrations which may be channeled to a mechanical element is satisfactory. The power requirements of the ultrasonic generator 10 will, of necessity, be determined by the area impacted and the degree of surface finish desired. This determination of output would only require the proper selection of any one of several commercially available ultrasonic generators. The generator 10 must be capable of providing an output of a frequency above 18,000 Hertz ± ½ %. The range of vibrations of 18,000 Hertz and above is defined as ultrasonic.

The output (vibrations) of the ultrasonic generator 10 must be concentrated and directed toward the workpiece 20. To provide this concentration and direction, concentrator-resonator horn 12 is provided. This concentrator-resonator horn 12, hereafter referred to as resonator horn 12 or horn 12, is attached to the ultrasonic generator 10 by any conventional and well-known means of attaching resonator horns to ultrasonic generators. The requirements for the resonator horn 12 are merely that it be of such dimensions and be compatable with the ultrasonic generator 10 so that the tip 18 will resonate at the primary resonating frequency of the generator 10.

Firmly attached and permanently fixed to the tip 18 of resonator horn 12 is impacting means 16 or hammer element 16. The impacting means 16 or hammer element 16 may be of several configurations as desired for the particular workpiece 20.

Hammers of a length of up to four inches have proven satisfactory. This length measurement is made in a direction transverse to the direction of movement of the surface being treated.

Figure 3:
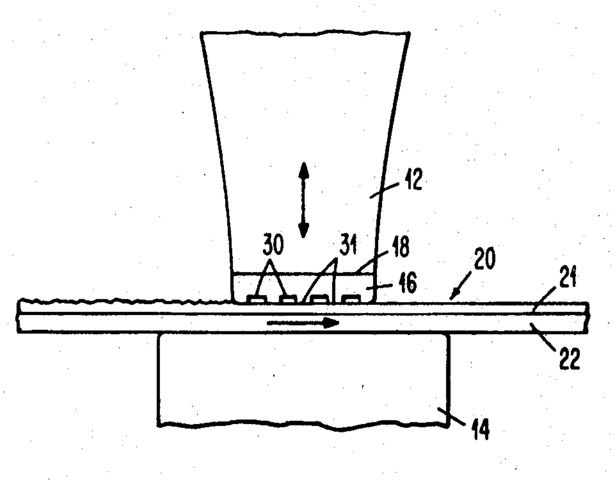
FIG. 3 shows a side view of the tip with the cross section of the impacting surface formed into channels.

Referring to FIG. 3, the hammer 16 is provided with channels 30 recessed into its impacting face, leaving reduced impact areas 31 to contact the oxide surface of the magnetically recordable record member 20.

These channels 30 and reduced impacting areas 31 serve a multiple purpose, in that the hammer 16, when vibrating, will encounter resistance to its impacting of the surface of record member 20, because an air film is caught between the hammer 16 and the magnetic oxide surface 21. By reducing the impact area and by providing the channels 30 in the impacting face, the air film is allowed to excape into non-impacting areas or channels 30, thereby allowing the hammer 16 to more easily strike the surface of the oxide layer 21.

A secondary reason for the channels 30 or similar configuration being formed into tip 16 is that the output of the generator 10, having been concentrated through horn 12, can be further concentrated into smaller, discrete areas by only allowing the reduced impact areas 31 to contact the oxide surface 21. If, for example, the total area of areas 31 is one-half the cross-sectional area of hammer 16, it can readily be seen that the impacting forces delivered to hammer 16 by horn 12 will then be concentrated in one-half its area and thereby increase the force per unit area by a factor of two. A similar relationship will exist with other reduced areas dependent only upon the sum of the areas 31 as related to the cross sectional area of hammer 16.

Thirdly, such a tip configuration will also allow the use of a lower power output ultrasonic generator 10 than would be required for the same impacting force per unit area if hammer 16 is not provided with such channels 30.

To provide a backing and support for the workpiece, a backing member 14, preferably of a reasonably hard rubber pad, is used. Any relatively resilient material providing a shock absorbing capability and yet having a sufficient resistance to movement to provide a backing is acceptable for backing member 14.

The rubber backing provides sufficient backing resistance to the movement of the tape 20 by hammer 16 to allow the compaction and smoothing of the surface layer, but will still be resilient enough to absorb shocks and not damage the tape due to the concentrated force applied to the surface. Other types of backing could be used, such as tetraflouroethylene, marketed by E. I. DuPont de Nemours & Company, under the name Teflon. The use of Teflon will provide a backing having a lubricating quality and reduce frictional forces between the tape 20 and the backing member 14.

Alternatively, backing member 14 could be a roller having the above mentioned resilient materials on its periphery. The roller would reduce the frictional forces between the tape 20 and the backing roller to a negligible level. In addition, the surface contact and the force per unit between tape 20 and hammer 16 can be varied by changing the diameter of the roller.

Backing member 14 is supported on frame 40, the same frame that supports ultrasonic generator 10. Both the backing member 14 and the ultrasonic generator 10 may be adjustable with respect to each other for ease of insertion and removal of the tape 20 or other record media.

Figure 2:
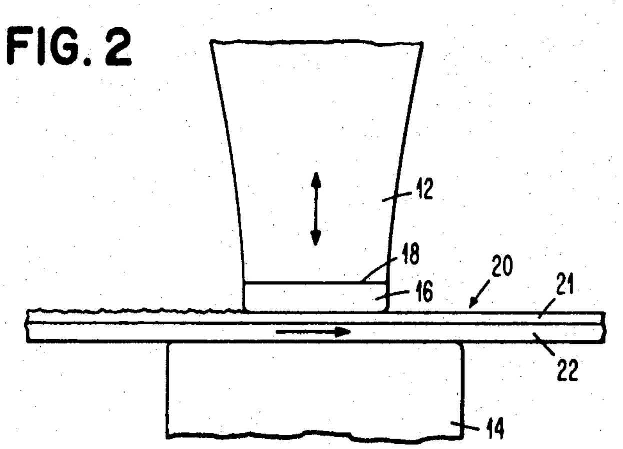
FIG. 2 is an enlarged view of the tip of the ultrasonic horn, backing means, and a cross sectional representation of the magnetic record surface.

Referring to FIGS. 1 and 2, backing member 14 is positioned in line and axially adjacent hammer 16. Adjustments are made so that the magnetic record member 20 may pass between backing member 14 and impacting hammer 16. The backing member 14 should be positioned such that when hammer 16 is extended in its cycle of vibration, the impacting surface of the hammer 16 will encounter the surface of the magnetic oxide 21 and when hammer 16 is at the most retracted point of its vibratory cycle, the impacting surface is completely withdrawn from the surface of the oxide coating 21. This is necessary so that sufficient force is impacted on the surface during the cycle to reduce the surface roughness but yet allow free movement of the magnetic recording medium during the retracted portion of the cycle.

As can be seen at a vibration frequency of 20,000 Hertz, the length of time during each cycle which the impact surface of hammer 16 and the oxide coating 21 of record media 20 are in contact is very small. The movement of the oxide coating will be negligible during that length of time and the incremental movements of a magnetic record media 20 will be small, presenting a small portion of the record media to the impact hammer 16 and reimpacting the surface a number of additional times. For example, assuming the magnetic tape is passing the impact hammer 16 at a linear rate of 200 inches per second and the ultrasonic generator 10 and horn 12 are vibrating and resonating respectively at 20,000 Hertz; the impact hammer will strike the magnetic oxide surface 21 approximately 100 times per inch of linear travel of the tape 20. Assuming an impact hammer 16 with a dimension in the direction of tape travel of ½-inch, each point on the tape will be impacted approximately 50 times in its passage past the ultrasonic surface finisher. Thus the tape will also only increment or move only approximately 0.010 inch during any one cycle of vibrations.

Since the hammer 16 will be in contact with the oxide surface 21 of member 20 for only a short period of this cycle, somewhat less than half of the vibratory cycle, and free movement is allowed during the remainer of the vibratory cycle, the tensile stresses in the substrate or carrier member 22 of record media 20 and the shearing stresses set up in the oxide coating 21 will be minimal since the tape will attempt to index less than 0.005 inch during any impacting portion of the cycle.

As can be seen from the foregoing discussion, the forces exerted upon any particular increment of oxide material 21 are primarily in a direction perpendicular to the substrate material 22 and any horizontal component of force is very minute, due to the extremely small increment of linear displacement during any one period of contact.

Also, it can be clearly seen that any horizontal components of force and horizontal stresses are released when impact hammer 16 is retracted by resonator horn 12 to a point above the surface of the oxide layer 21. The distance that hammer 16 vibrates during any particular cycle will be greatly dependent upon the choice of ultrasonic generator and resonator horn. However, experiments have shown that the approximate amplitude of vibration is in the order of 0.005 inch. This is sufficient movement to allow the free incrementing of the magnetic tape surface.

As magnetic tapes generally have a complete finished thickness dimension including both the plastic substrate and the oxide coating of from 0.001 inch to 0.002 inch and where the oxide coating makes up approximately one-quarter to one-third of this thickness, one skilled in the art can easily see that with an amplitude of vibration of hammer 16 of 0.005 inch there will be adequate clearance for the indexing or incrementing of the tape without resistance due to interference of high spots on the oxide coating and hammer 16.

Figure 4:
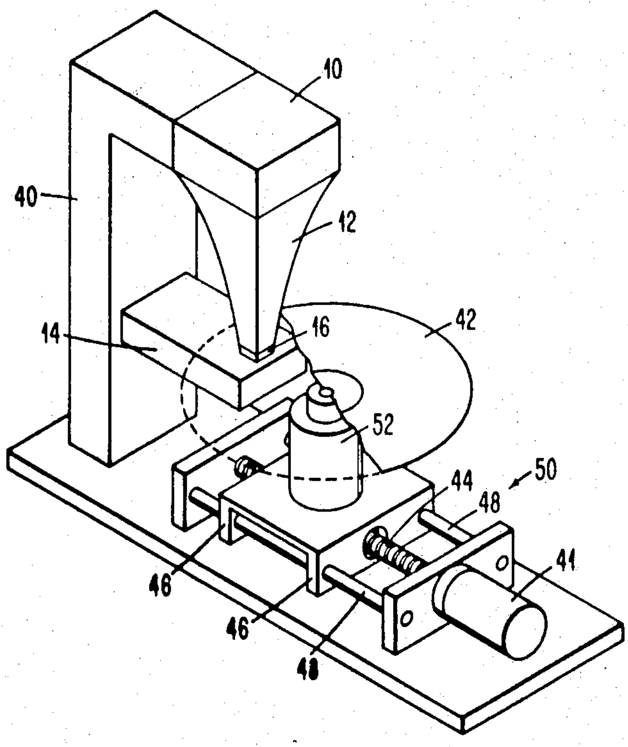
FIG. 4 is a perspective view of an ultrasonic finisher for treating the surface of a magnetic disk, including a disk positioning means.

FIG. 4 illustrates a variable positioning means for supporting a disk in working position with respect to the surface finisher. A linear actuator drive motor 41 drives a lead screw 44. Lead screw 44 moves the revolver support 46 linearly along support rods 48. Mounted on the revolver support 46 is revolver motor 52 which drives disk 42 at the selected rate of speed. Motors 41 and 52 are both of the controllable variable speed variety. This allows control of the relative movement of the disk with respect to the axis of movement of the hammer 16. A constant, continuous linear movement of the revolver support 46 and a constant speed revolving of the disk 42 will yield a spiral pattern. The rate of the decrease or increase of the radius of the spiral may be controlled by the speed of motor 41.

Figure 5:
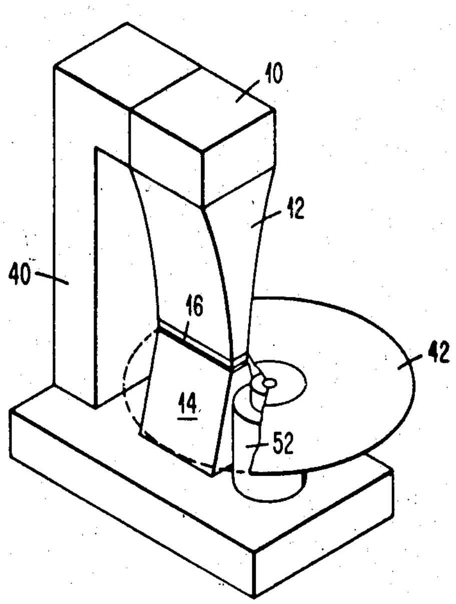
FIG. 5 is a perspective view of an ultrasonic finisher for treating the surface of a magnetic disk.

Referring to FIG. 5, a surface finisher similar to that of FIG. 1 is shown but modified for magnetic disk finishing by the combination of a disk positioner. Attached to the support frame 40 is a revolver motor 52. A magnetic oxide coated disk is supported on the motor and positioned between hammer 16 and backing means 14. Backing means 14 and hammer 16 are formed as a rectangle or wedge having a long axis approximately equal to the radius of the disk.

OPERATION OF THE INVENTION

Referring to FIG. 1, the ultrasonic generator 10 is activated from a power source and together with the resonator-concentrator horn 12 vibrates the tip of hammer 16. Magnetic tapes, magnetic disks, or strips having the oxide coating on their uppermost side are fed between the tip and its backing member 14. As the tape 20 or magnetic surface is indexed past the oscillating or vibrating hammer 16, it is impacted repeatedly by the impact surface of hammer 16, thereby reducing the height of high spots and tending to pack in and fill the low spots as illustrated in FIG. 2. The tape 20 may be fed from a slitting machine or it may be fed in broad sheets where the lateral dimension of the hammer 16 is such that it will encompass the full width of the tape. The record 20 is continuously indexed by an indexing means. This indexing means is supply and take-up reels 25 and 27 illustrated in FIG. 1. The speed of the record 20 is controlled by either the drive motors of the supply and take-up drives 24, 26, or by a capstan drive assembly 28.

In FIG. 4 is illustrated a surface finisher for a magnetic disk 42. In this arrangement the disk 42 is indexed past the impacting zone of the hammer 16 by revolving the disk 42 and removing the disk linearly in a dimension so that the impacting zone lies in a straight line and as a radius of the disk 42. This composite movement is controlled to eventually cause the hammer 16 to impact the entire surface area of the disk 42 during its period of surface treatment. By a slow linear movement of the linear actuator 50 and a constant rotation of the disk 42 the path of the impacting zone will describe a spiral of increasing radius. If the rate of increase of the radius is very small the impacting zone path will overlap a previously finished portion insuring uniform exposure of the oxide surface of the disk 42 to the impacting hammer 16.

The linear action is controlled by drive motor 41 which drives a lead screw 44. Lead screw 44 pulls the revolver support 46 along guide rods 48 and the revolving motor acts to revolve the disk 42. By controlling the speeds of the two motors 41, 52 with respect to the frequency of the ultrasonic generator 10, a path will be generated on the surface of the disk corresponding to a spiral. The width of the path of the spiral and the change in radius are controlled such that the paths overlap and provide complete coverage of the disk.

The entire operation of surface finishing would normally be conducted after the binder in the unfinished tape has been cured to drive off any solvents which would remain in the oxide coating from the coating process. After the ultrasonic finishing of the surface of the oxide coating, the tape may be split and wound on reels or may merely be rewound for a subsequent slitting. An alternative would be to slit the tape prior to the ultrasonic finishing in which case one ultrasonic finisher would be required for each individual tape exiting from the slitting apparatus.

For high linear speeds where the surface is not adequetly finished in a single pass by the impacting zone, the magnetic surface may be serially treated by successive surface finisher hammers. This is possible so long as the hammers are not rigidly physically interconnected. The hammers will not adversely effect each other's impacting when allowed to vibrate independently, but will tend to dampen or cancel out each other's vibrations if rigidly connected together. Thus the area impacted is limited only by the number of surface finishers positionable around the surface and the size of the impact hammers.

Also, one skilled in the art can readily see that very wide tapes may be processed prior to slitting by employing staggered surface finishers, each finishing a selected band width on the wide tape.

As can be seen from the foregoing description and operation of the invention, the disclosure has been directed to the finishing of magnetically recordable record mediums and specifically for illustrative purposes only to the surface finishing of magnetic tape. Embodiments of disk finishers are disclosed and one skilled in the art will recognize that the process disclosed for finishing magnetic tape can be readily applied to the finishing of disks. One skilled in the art could easily recognize other uses for such a finishing apparatus and method and, to illustrate only a few, an apparatus or method similar or identical to this could be employed to surface finish paper, cardboard, and other soft, pliable sheet materials as they emanate from their production machines and prior to any final processing which would render their surface resistant to such an ultrasonic surface treatment. Paper pulp is normally rolled into sheets and the binder or water is driven off and on occasion a higher surface finish is required. At this point the treatment of the paper could be accomplished by an ultrasonic surface finisher and would leave a smooth surface. Likewise, should a paper or cardboard texture be required other than a smooth surface such as a pebbled finish, a possibility would be to increase the linear speed of the web moving past the finishing point and to substantially reduce the width of the impacting tool such that the impacting blows would not overlap and would not tend to smooth the surface. By causing the tip to have a desired surface configuration, this configuration in its complementary form would then be transferred to the surface of the web passing the finishing point. Thus, a stippled or pebbled surface would be secured and the desired roughness could likewise be controlled by the adjustment of the backing pad, the water content of the paper and cardboard, and the linear speed of the web being indexed or incremented past the finishing point.

The preferred embodiment is disclosed as utilizing an ultrasonic frequency, but one skilled in the art would recognize that a hammer operating at a frequency lower than 18,000 Hertz could well be used to surface finish magnetic recording surfaces. In such a case, the speed of the hammer at impact would necessarily be high enough to smooth the surface as described earlier.

While the invention has been particularly shown and described with reference to preferred embodiments thereof, it will be understood by those skilled in the art that the foregoing and other changes in form and details may be made therein without departing from the spirit and the scope of the invention.

I claim:

1. An apparatus for reducing surface roughness and smoothing a magnetic recording surface comprising:

a frame;

an impacting means having an impacting portion, said impacting means being supported by said frame;

a resilient self-lubricating backing means composed of polytetrafluoroethylene, rigidly supported by said frame and positioned in close proximity to said impacting portion of said impacting means and axially spaced apart slightly therefrom, for resiliently supporting the magnetic recording surface;

a magnetizeable record surface transporting means for transporting said record intermediate said backing means and for said impacting means, said transporting means adapted for continuous relative movement of said record surface between said impacting means and said backing means and said record surface, whereby a magnetizeable record surface is continuously moved past a zone where said surface is repeatedly impacted by said impacting means and said surface is thereby smoothed and surface roughness reduced.

2. The apparatus of claim 1 wherein said impacting means further comprises:

an ultrasonic generator;

an ultrasonic resonator horn connected to said generator;

and an impacting hammer attached at the resonating end of said horn.

3. The apparatus of claim 2 wherein said hammer has a plurality of impacting areas formed into the impacting surface of said hammer.

4. The apparatus of claim 2 wherein said transporting means further comprises a magnetic disk positioning means.

5. The apparatus of claim 1 wherein said transporting means further comprises:

a supply reel for holding and supplying a magnetizeable tape;

a drive means for driving said supply reel;

a take-up reel for receiving and holding said magnetizeable tape;

a drive means for driving said take-up reel.

6. An apparatus for reducing surface roughness and smoothing a magnetic surface on a magnetic tape comprising:

a frame;

an ultrasonic generator supported by said frame;

a resonator horn attached to said ultrasonic generator such that said generator causes said horn to resonate;

an impacting hammer fixedly attached to the resonating end of said resonator horn;

a resilient backing pad composed of a hard rubber, rigidly supported by said frame and co-axially aligned in close proximity to said impacting hammer for resiliently supporting said magnetic tape and oxide surface;

a winding and reeling means attached to said frame for transporting, supplying, and reeling said magnetic tape, said winding and reeling means further comprising a supply reel, a supply reel drive, a take-up reel, and a take-up reel drive, said winding and reeling means adapted for continuous movement of said magnetic tape between said hammer and said backing pad, whereby said magnetic tape is continuously moved past a zone where magnetic oxide surface is repeatedly impacted by said hammer and said surface is thereby smoothed and the surface roughness thereof reduced.

* * * * *